United States Patent
Benner et al.

(10) Patent No.: US 8,284,064 B2
(45) Date of Patent: Oct. 9, 2012

(54) SIGNAL TRANSMITTER FOR A FILLING LEVEL SENSOR

(75) Inventors: Hans-Guenter Benner, Kriftel (DE); Bernd Pauer, Eppstein (DE)

(73) Assignee: Contintal Automotive GmbH, Hannover (DE)

( * ) Notice: Subject to any disclaimer, the term of this patent is extended or adjusted under 35 U.S.C. 154(b) by 520 days.

(21) Appl. No.: 12/598,861

(22) PCT Filed: Apr. 2, 2008

(86) PCT No.: PCT/EP2008/053900
§ 371 (c)(1),
(2), (4) Date: Nov. 4, 2009

(87) PCT Pub. No.: WO2008/135324
PCT Pub. Date: Nov. 13, 2008

(65) Prior Publication Data
US 2010/0090842 A1 Apr. 15, 2010

(30) Foreign Application Priority Data
May 4, 2007 (DE) .......................... 10 2007 021 027

(51) Int. Cl.
*G08B 21/00* (2006.01)
(52) U.S. Cl. ........ 340/603; 340/625; 340/612; 340/623; 73/305; 73/317; 73/290 R
(58) Field of Classification Search ................. 340/603, 340/625, 612, 615, 616, 623, 687, 686.1; 73/305, 313, 317, 290 R, 322.5; 338/190, 338/202
See application file for complete search history.

(56) References Cited

U.S. PATENT DOCUMENTS

| | | | |
|---|---|---|---|
| 3,482,200 A | 12/1969 | Hamilton | |
| 3,876,967 A | 4/1975 | Hehl et al. | |
| 4,557,144 A | 12/1985 | Lucchini | |
| 5,765,435 A * | 6/1998 | Grotschel et al. | 73/313 |
| 6,127,916 A | 10/2000 | Cooper et al. | |
| 6,276,201 B1 * | 8/2001 | Gette et al. | 73/317 |
| 6,425,288 B1 | 7/2002 | Pauer | |
| 6,886,403 B2 | 5/2005 | Labarge et al. | |
| 2004/0255669 A1 | 12/2004 | LaBarge et al. | |

FOREIGN PATENT DOCUMENTS

| | | |
|---|---|---|
| DE | 1865954 | 1/1963 |
| DE | 2254085 | 5/1974 |
| DE | 3330871 | 3/1984 |
| DE | 19709738 | 9/1998 |
| DE | 19842243 | 4/2000 |
| JP | 6-174532 A | 6/1994 |
| JP | 2004-061420 A | 2/2004 |
| WO | WO 03003384 | 1/2003 |

* cited by examiner

*Primary Examiner* — Toan N Pham
(74) *Attorney, Agent, or Firm* — Cozen O'Connor

(57) ABSTRACT

A signal transmitter for a filling level sensor has two sliding contacts which are manufactured integrally with a holder and with spring elements. This leads to the manufacturing costs of the signal transmitter being particularly low. The sliding contacts are arranged on spring tongues and are connected to one another via a link. The spring tongues and the spring elements are therefore arranged in a row and allow the sliding contacts to be prestressed particularly uniformly against sliding tracks of the signal transmitter.

8 Claims, 2 Drawing Sheets

SIGNAL TRANSMITTER FOR A FILLING LEVEL SENSOR

PRIORITY CLAIM

This is a U.S. national stage of application No. PCT/EP2008/053900, filed on Apr. 2, 2008 which claims Priority to the German Application No.: 10 2007 021 027.4, Filed: May 4, 2007, the contents of both being incorporated herein by reference.

BACKGROUND OF THE INVENTION

1. Field of the Invention

The invention relates to a signal transmitter for a filling level sensor of a motor-vehicle tank configured to produce an electrical signal as a function of a pivoting angle of a filling level sensor lever arm supporting a float. A support is provided for attachment to a vertical wall in the tank having sliding tracks with sliding contacts arranged on the lever arm. A spring element is provided for preloading the sliding contacts against the sliding tracks and a holder holds the spring element on the lever arm. Each sliding contact is being arranged on individual spring tongues spaced apart on a common bridge.

2. Prior Art

Signal transmitters are used especially for determining fuel filling levels in fuel tanks of today's motor vehicles. In general, two sliding contacts bridge two sliding tracks of the signal transmitter, with the result that onward-leading electrical leads can only be connected to fixed components. In the known signal transmitters, the bridge is held movably in the lever arm. The spring element is likewise held in the lever arm and preloads the bridge centrally. The movable holding of the bridge and the spring element make it possible to equalize the tilt of the two sliding contacts relative to one another. This ensures that the two spring contacts are each preloaded against the respective sliding track with a same force. The total preloading force of the sliding contacts against the sliding tracks is determined by the series-connected spring tongues with the spring element. However, the known signal transmitter is disadvantageous because it is composed of a very large number of components that have to be assembled, and is therefore very expensive to manufacture.

SUMMARY OF THE INVENTION

A problem underlying the invention is that of developing a signal transmitter of the type stated at the outset in such a way that it is particularly simple to manufacture.

According to one embodiment of the invention, this problem is solved by virtue of the fact that the holder, the spring element, the bridge, and the sliding contacts with the spring tongues are manufactured in one piece.

This design minimizes the number of components to be assembled in the signal transmitter according to one embodiment the invention to a particularly low level. As a result, the signal transmitter is particularly simple to manufacture. Since the signal transmitter according to the invention, like the known signal transmitter, has two spring components in series—the spring element and the spring tongues—the sliding contacts are reliably prevented from lifting off the sliding tracks in the case of vibration, which occurs frequently in motor vehicles. Another advantage of this design is that relative motion between a number of components caused by the vibration or by pivoting of the lever arm, for example, is avoided due to the one-piece construction of the components. Such relative motion gives rise to unwanted wear and friction.

According to an advantageous embodiment of the invention, equalizing the tilt of the sliding contacts is particularly simple if the spring element is connected to the bridge by a transverse bar arranged transversely to the bridge.

The one-piece manufacture of the components of the signal transmitter according to the invention is particularly simple if the holder, the spring element, and the sliding contacts with the spring tongues are punched or cut out of a spring plate.

The transverse bar is preferably hinged centrally on the bridge, for example. However, particularly uniform preloading of the sliding contacts against the sliding tracks can be achieved in a simple manner if the transverse bar is hinged to the bridge at a point closer to the sliding contact remote from the holder than to the sliding contact close to the holder.

According to another embodiment of the invention, particularly reliable preloading of the sliding contacts against the sliding tracks is ensured if the spring element is of elongate design and is arranged parallel to the bridge.

According to another embodiment of the invention, equalizing the tilt of the sliding contacts is simplified if two spring elements are arranged parallel to one another between the holder and the transverse bar.

According to another embodiment of the invention, an intended spring preloading of the sliding contacts against the sliding tracks is achieved in a simple manner by an appropriate choice of dimensions for the spring elements if the holder has a web connecting the two elongate spring elements, and if the web is hinged on the holder. With the spacing between the holder and the sliding contacts fixed, it is a simple matter to vary the lengths of the spring elements by an appropriate choice of length for the web and to thereby set the spring preloading. In particular, if the elongate spring elements are connected to each other by the transverse bar, a torsionally stiff frame is produced which contributes to evening out the preloading of the sliding contacts against the sliding tracks.

According to another embodiment of the invention, the manufacture of the sliding contacts with the spring tongues and the spring elements from a spring plate is particularly simple if one of the sliding contacts is arranged between the spring elements in a plan view of the sliding contacts.

BRIEF DESCRIPTION OF THE DRAWINGS

Numerous embodiments of the invention are possible. To illustrate its basic principle further, one such embodiment is shown in the drawing and described below. In the drawings.

DETAILED DESCRIPTION OF THE DRAWINGS

Figure 1:
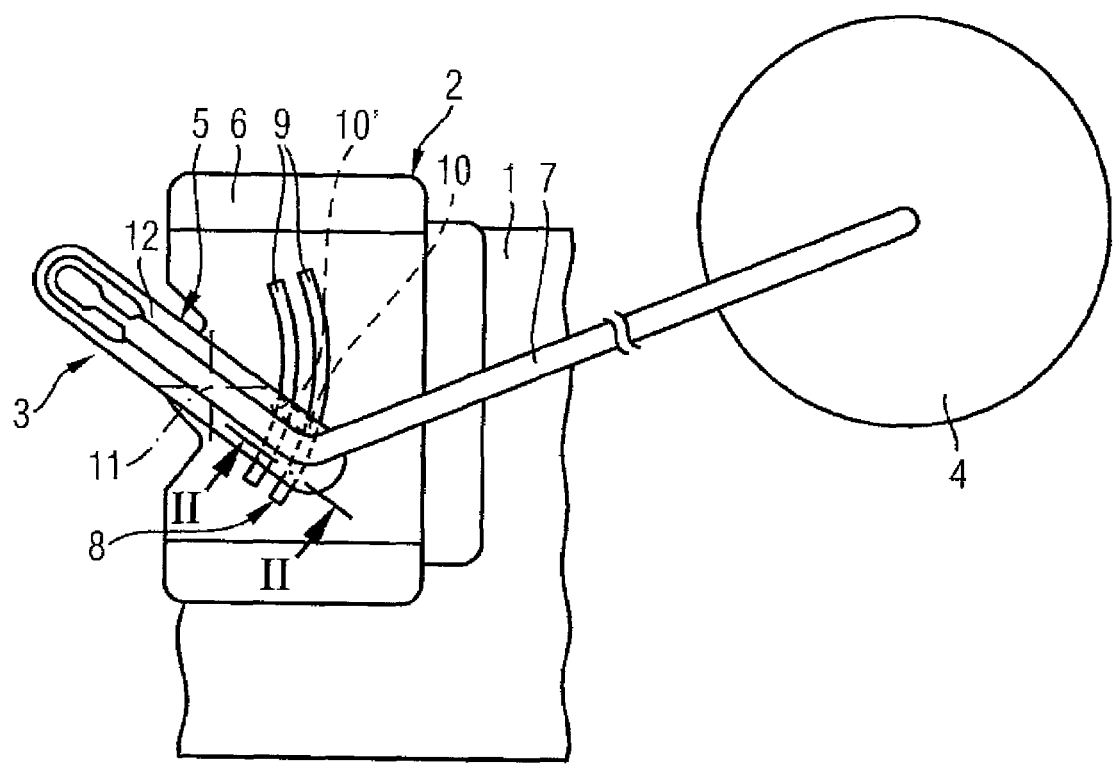
FIG. 1 is a filling level sensor with a signal transmitter according to the invention.

FIG. 1 is a filling level sensor 2 mounted on a vertical wall 1 within a fuel tank. The filling level sensor 2 has a float 4 attached to a lever arm 3. The float 4 follows a fuel filling level (not shown) in the fuel tank, pivoting the lever arm 3 as it does so. The lever arm 3 is mounted pivotably on a support 6 by a bracket 5, preferably manufactured from plastic, and has a lever wire 7, which is attached to the bracket 5, to hold the float 4. The pivot angle of the lever arm 3 is detected by a signal transmitter 8 designed as a potentiometer and is converted into electrical signals. The signal transmitter 8 has two sliding tracks 9, 9' (FIG. 2) arranged on the support 6 and two sliding contacts 10, 10', which are attached to the bracket 5 and are connected electrically to each other, for the purpose of bridging the sliding tracks 9, 9'. The electrical signals corresponding to the fuel filling level thus arise at the support 6 and hence at a fixed component of the filling level sensor 2. The lever arm 3 is mounted in the support 6 with a mounting axis 11 perpendicular to the plane of the drawing.

Figure 2:
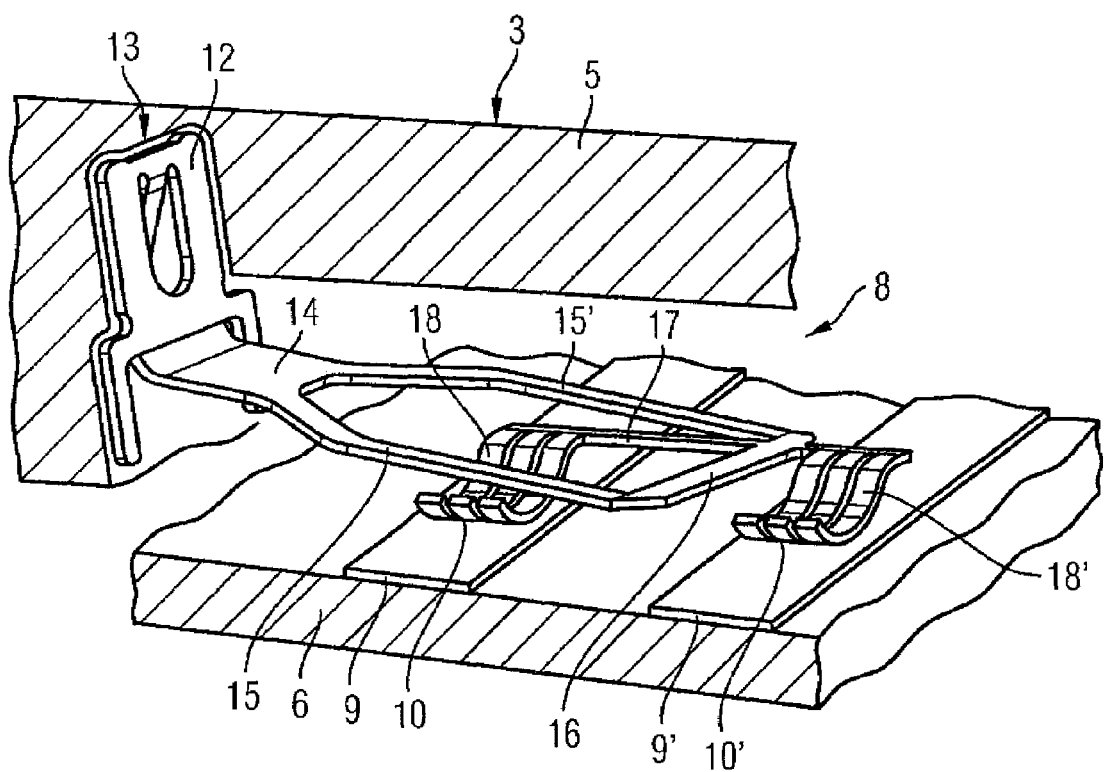
FIG. 2 is a partial section through the filling level sensor shown in FIG. 1 along the line II-II on a greatly enlarged scale.

FIG. 2 shows the signal transmitter 8 on a greatly enlarged scale in a section through the filling level sensor 2 shown in FIG. 1 along the line The sliding contacts 10, 10' are connected to a holder 12. The holder 12 is snapped into a recess 13 in the bracket 5 and connected to two elongate spring elements 15, 15' by an angled web 14. The ends of the spring elements 15, 15' remote from the web 14 are connected to each other and to a bridge 17 between the sliding contacts 10, 10' by a transverse bar 16. The two elongate spring elements 15, 15' are arranged parallel to the bridge 17. The sliding contacts 10, 10' are hinged on the bridge 17 by spring tongues 18, 18'. The holder 12, the web 14, the elongate spring elements 15, 15', the transverse bar 16, the bridge 17, the spring tongues 18, 18' and the sliding contacts 10, 10' are manufactured in one piece from a spring plate by cutting and bending. For this purpose, the spacing between the elongate spring elements 15, 15' is made greater than the width of the sliding contacts 10, 10' together with the spring tongues 18, 18'. Together with the web 14 and the transverse bar 16, the elongate spring elements 15, 15' form a frame which preloads the two sliding contacts 10, 10' jointly against the sliding tracks 9, 9' and makes it possible to equalize the tilt of the sliding contacts 10, 10'. This ensures that the two sliding contacts 10, 10' are each preloaded against the sliding tracks 9, 9' with the same force. The spring tongues 18, 18' and the spring elements 15, 15' arranged in series with them generate a preload which presses the sliding contacts 10, 10' against the sliding tracks 9, 9'. The transverse bar 16 is hinged on the bridge 17 at a point closer to the sliding contact 10' remote from the holder 12 than to the sliding contact 10 close to the holder 12, and this makes an additional contribution to the equalizing of the tilt.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A signal transmitter for a filling level sensor of a fuel tank, the signal transmitter configured to produce electrical signals as a function of a filling level of the fuel tank, the signal transmitter comprising:
    a filling level sensor lever arm supporting a float following the filling level of the fuel tank;
    a support for attachment of the filling level sensor lever arm to a vertical wall in the fuel tank;
    at least two sliding tracks arranged on the support;
    at least two sliding contacts arranged on the lever arm, each of the at least two sliding contacts configured to mate with a respective one of the sliding tracks;
    a spring element for preloading the two sliding contacts against the sliding tracks;
    a common bridge attached to the spring element;
    a holder for holding the spring element on the lever arm; and
    a spring tongue for each of the respective sliding contacts, the spring tongues spaced apart on the common bridge,
    wherein the holder, the spring element, the common bridge, the sliding contacts, and the spring tongues are manufactured in one piece.

2. The signal transmitter according to claim 1, wherein the spring element is connected to the bridge by a transverse bar arranged transversely to the common bridge.

3. The signal transmitter as claimed in claim 2, wherein the spring element is of elongate design arranged parallel to the common bridge.

4. The signal transmitter as claimed in claim 2, wherein two spring elements are arranged parallel to one another and extend between the holder and the transverse bar.

5. The signal transmitter as claimed in claim 4, wherein the holder further comprises a web configured to connect the two elongate spring elements, the web being hinged on the holder.

6. The signal transmitter as claimed in claim 4, wherein the sliding contacts are arranged between the spring elements.

7. The signal transmitter as claimed in claim 1, wherein the holder, the spring element, the common bridge, the sliding contacts, and the spring tongues are one of punched and cut out of a spring plate.

8. The signal transmitter as claimed in claim 2, wherein the transverse bar is hinged to the common bridge at a point closer to the sliding contact remote from the holder than to the sliding contact close to the holder.

\* \* \* \* \*